United States Patent

Saito

(10) Patent No.: US 10,072,579 B2
(45) Date of Patent: Sep. 11, 2018

(54) APPARATUS FOR DISCRIMINATING IGNITION IN A GAS-TURBINE AEROENGINE

(71) Applicant: HONDA MOTOR CO., LTD., Tokyo (JP)

(72) Inventor: Masaharu Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 14/689,292

(22) Filed: Apr. 17, 2015

(65) Prior Publication Data

US 2016/0305329 A1   Oct. 20, 2016

(51) Int. Cl.
*F02C 7/26* (2006.01)
*F02C 9/28* (2006.01)
*F02C 7/264* (2006.01)
*F02C 9/16* (2006.01)
*F01D 21/00* (2006.01)

(52) U.S. Cl.
CPC .......... *F02C 7/264* (2013.01); *F01D 21/003* (2013.01); *F02C 9/16* (2013.01); *F02C 9/28* (2013.01); *F05D 2260/80* (2013.01)

(58) Field of Classification Search
CPC .......... F02C 7/264; F02C 7/268; F02C 7/275; F02C 7/277; F02C 7/26; F02C 7/262; F02C 9/28; F02C 9/46; F01D 21/003; F05D 2260/80; F05D 2260/85
See application file for complete search history.

(56) References Cited

U.S. PATENT DOCUMENTS

| 5,107,674 A * | 4/1992 | Wibbelsman | F02C 7/26 60/778 |
| 2007/0005219 A1 * | 1/2007 | Muramatsu | F01D 21/003 701/100 |
| 2007/0051111 A1 * | 3/2007 | Uluyol | F02C 7/26 60/778 |

FOREIGN PATENT DOCUMENTS

| JP | 11-326042 | 11/1999 |
| JP | 2009-236122 | 10/2009 |

* cited by examiner

*Primary Examiner* — Andrew Nguyen
(74) *Attorney, Agent, or Firm* — Rankin, Hill & Clark LLP

(57) ABSTRACT

An apparatus for discriminating ignition in a gas-turbine aeroengine is configured to discriminate that ignition occurred in a combustion chamber upon discriminating that a calculated high-pressure turbine rotational speed change rate at a detected high-pressure turbine rotational speed equal to or greater than a predetermined rotational speed threshold is equal to or greater than a predetermined rotational speed change rate threshold and that the change rate has been equal to or greater than the predetermined rotational speed change rate threshold continuously for a predetermined time period or longer, whereby whether or not ignition of an air-fuel mixture occurred in a combustion chamber can be accurately discriminated or determined without using a dedicated sensor or detector even when an EGT sensor or detector fails.

10 Claims, 3 Drawing Sheets

APPARATUS FOR DISCRIMINATING IGNITION IN A GAS-TURBINE AEROENGINE

BACKGROUND OF THE INVENTION

Field of the Invention

An embodiment of this invention relates to an apparatus for discriminating ignition in a gas-turbine aeroengine.

Description of the Related Art

A gas-turbine aeroengine is typically equipped with at least a high-pressure turbine rotated by injection of high-pressure gas produced upon ignition and combustion of an air-fuel mixture in a combustion chamber and with a low-pressure turbine located downstream of the high-pressure turbine to be rotated by low-pressure gas exiting the high-pressure turbine. Such a gas-turbine aeroengine requires discrimination or detection of whether or not ignition occurred in the combustion chamber.

Patent Document 1 teaches discrimination of ignition in the combustion chamber by detecting ultraviolet ray quantity among the quantities of state of the burning gas flame. However, the technique taught by Japanese Laid-Open Patent Application No. H11 (1999)-326042 (Patent Document 1) requires a dedicated sensor or detector and therefore unavoidably increases cost and weight.

This led to the development of the technique of Japanese Laid-Open Patent Application No. 2009-236122 (Patent Document 2), which takes advantage of the output of the existing EGT (exhaust gas temperature) sensor used to detect EGT for use in, inter alia, fuel control at engine starting, calculates the rate of exhaust gas temperature change per unit speed of rotation after output of an ignition command, and discriminates that ignition occurred in the combustion chamber when the rate equals or exceeds a predetermined value.

SUMMARY OF THE INVENTION

Although the technique of Patent Document 2 is configured to discriminate ignition in a combustion chamber without using a dedicated sensor or detector, ignition discrimination becomes impossible when the EGT sensor or detector fails.

An object of this invention is therefore to overcome the aforesaid problem by providing an apparatus for discriminating ignition in a gas-turbine aeroengine which discriminates occurrence of ignition in a combustion chamber based on an output of a sensor or detector for detecting rotational speed of a high-pressure turbine instead of an output of an EGT sensor or detector.

In order to achieve the object, the invention provides in its first aspect an apparatus for discriminating occurrence of ignition in a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure turbine to be rotated by low-pressure gas exiting the high-pressure turbine, comprising: a high-pressure turbine rotational speed sensor adapted to detect a rotational speed of the high-pressure turbine; a turbine rotational speed threshold discriminator that discriminates whether the detected rotational speed of the high-pressure turbine is equal to or greater than a predetermined rotational speed threshold; a turbine rotational speed change rate calculator that calculates a change rate of the detected rotational speed of the high-pressure turbine; a turbine rotational speed change rate threshold discriminator that discriminates whether the calculated change rate of the detected rotational speed of the high-pressure turbine is equal to or greater than a predetermined rotational speed change rate threshold; a continuance time period discriminator that discriminates whether the calculated change rate of the detected rotational speed of the high-pressure turbine has been equal to or greater than the predetermined rotational speed change rate threshold continuously for a predetermined time period, when it is discriminated that the calculated change rate of the detected rotational speed of the high-pressure turbine is equal to or greater than the predetermined rotational speed change rate threshold; and an ignition occurrence discriminator that discriminates that the ignition of the air-fuel mixture has occurred in the combustion chamber when it is discriminated that the detected rotational speed of the high-pressure turbine is equal to or greater than the predetermined rotational speed threshold, the calculated change rate of the detected rotational speed of the high-pressure turbine is equal to or greater than the predetermined rotational speed change rate threshold, and the calculated change rate of the detected rotational speed of the high-pressure turbine has been equal to or greater than the predetermined rotational speed change rate threshold continuously for the predetermined time period.

In order to achieve the object, the invention provides in its second aspect a method for discriminating ignition in a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure turbine to be rotated by low-pressure gas exiting the high-pressure turbine, comprising the steps of: detecting a rotational speed of the high-pressure turbine; discriminating whether the detected rotational speed of the high-pressure turbine is equal to or greater than a predetermined rotational speed threshold; calculating a change rate of the detected rotational speed of the high-pressure turbine; discriminating whether the calculated change rate of the detected rotational speed of the high-pressure turbine is equal to or greater than a predetermined rotational speed change rate threshold; discriminating whether the calculated change rate of the detected rotational speed of the high-pressure turbine has been equal to or greater than the predetermined rotational speed change rate threshold continuously for a predetermined time period, when it is discriminated that the calculated change rate of the detected rotational speed of the high-pressure turbine is equal to or greater than the predetermined rotational speed change rate threshold; and discriminating that the ignition of the air-fuel mixture has occurred in the combustion chamber when it is discriminated that the detected rotational speed of the high-pressure turbine is equal to or greater than the predetermined rotational speed threshold, the calculated change rate of the detected rotational speed of the high-pressure turbine is equal to or greater than the predetermined rotational speed change rate threshold, and the calculated change rate of the detected rotational speed of the high-pressure turbine has been equal to or greater than the predetermined rotational speed change rate threshold continuously for the predetermined time period.

BRIEF DESCRIPTION OF DRAWINGS

The above and other objects and advantages of the invention will be more apparent from the following description and drawings in which.

DESCRIPTION OF EMBODIMENT

An embodiment of the apparatus for discriminating ignition in a gas-turbine aeroengine according to the present invention will now be explained with reference to the attached drawings.

Figure 1:
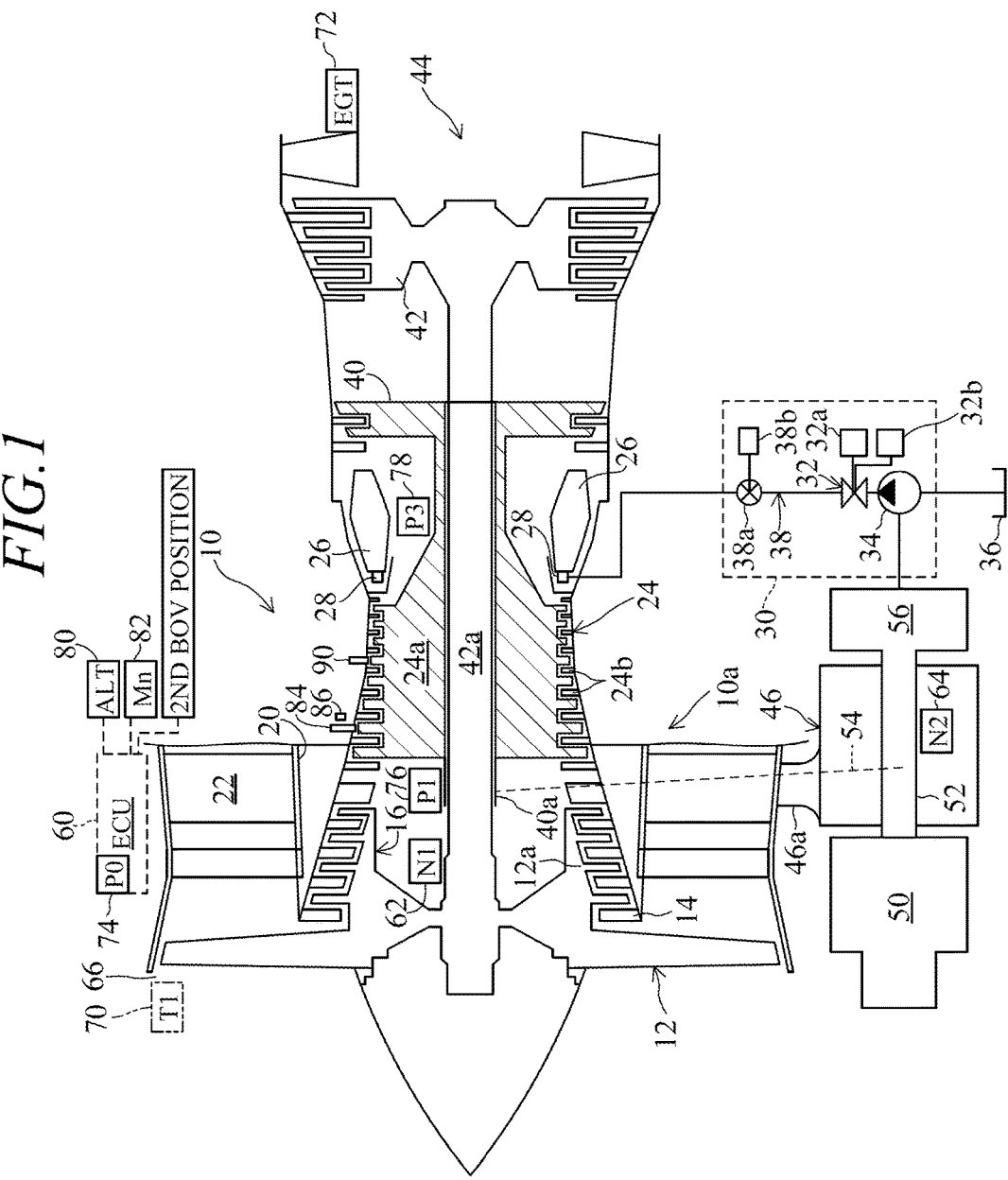
FIG. 1 is an overall schematic view of the apparatus for discriminating ignition in a gas-turbine aeroengine.

FIG. 1 is an overall schematic view of the apparatus for discriminating ignition in a gas-turbine aeroengine.

Four types of gas-turbine aeroengines are known: the turbojet engine, turbofan engine, turboprop engine and turboshaft engine. A two-shaft turbofan engine will be taken as an example in the following explanation.

In FIG. 1, reference numeral 10 designates the turbofan engine (gas turbine engine; hereinafter referred to as "engine"). Reference numeral 10a designates a main engine unit. Two of the engines 10 are installed, one on either side of an aircraft (whose airframe is not shown).

The engine 10 is equipped with a fan (fan blades) 12 that sucks in external air while rotating rapidly. A rotor 12a is formed integrally with the fan 12. The rotor 12a and a stator 14 facing it together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The wind from the fan 12 produces a force of reaction that acts on the airframe (not shown) on which the engine 10 is mounted as a propulsive force (thrust). Most of the propulsion is produced by the air flow from the fan.

The air compressed by the low-pressure compressor 16 flows rearward to a high-pressure compressor 24 where it is further compressed by a rotor 24a and stator 24b and then flows rearward to a combustion chamber 26.

The combustion chamber 26 is equipped with a fuel nozzle 28 that is supplied with pressurized fuel metered by an FCU (fuel control unit) 30. The FCU 30 is equipped with a fuel metering valve (FMV) 32. Fuel pumped by a fuel pump 34 from a fuel tank 36 located at an appropriate part of the airframe is metered by the fuel metering valve 32 and supplied to the fuel nozzle 28 through a fuel supply line 38.

The fuel metering valve 32 is connected to a torque motor 32a to be opened/closed thereby. The position of the fuel metering valve 32 is detected by a nearby valve position sensor 32b. A fuel shutoff valve (SOV) 38a is interposed in the fuel supply line 38. The fuel shutoff valve 38a is connected to an electromagnetic solenoid 38b to be opened/closed thereby.

The fuel nozzle 28 sprays the fuel supplied through the fuel supply line 38.

The fuel sprayed from the fuel nozzle 28 and compressed air supplied from the high-pressure compressor 24 are mixed in the combustion chamber 26 and the air-fuel mixture is burned after being ignited at engine starting by an ignition unit (not shown) comprising an exciter and a sparkplug. Once the air-fuel mixture begins to burn, the air-fuel mixture composed of compressed air and fuel is continuously supplied and burned.

The hot high-pressure gas produced by the combustion is sent to a high-pressure turbine 40 to rotate it at high speed. The high-pressure turbine 40 is connected to the rotor 24a of the high-pressure compressor 24 through a high-pressure turbine shaft 40a to rotate the rotor 24a.

After driving the high-pressure turbine 40, the hot high-pressure gas is sent to a low-pressure turbine 42 to rotate it at relatively low speed. The low-pressure turbine 42 is connected to the rotor 12a of the low-pressure compressor 16 through a low-pressure turbine shaft 42a (in a dual concentric structure with the shaft 40a), so as to rotate the rotor 12a and fan 12. The gas having passed through the high-pressure turbine 40 is lower in pressure than gas jetted from the combustion chamber 26.

The exhaust gas exiting the low-pressure turbine 42 (turbine exhaust gas) is mixed with the fan exhaust air passing as is through the duct 22 and jetted together rearward of the engine 10 through a jet nozzle 44.

An accessory drive gearbox (hereinafter referred to as "gearbox") 46 is attached to the outer undersurface at the front end of the main engine unit 10a through a stay 46a. An integrated starter/generator (hereinafter called "starter") 50 is attached to the front of the gearbox 46. The FCU 30 is located at the rear of the gearbox 46.

At starting of the engine 10, the starter 50 rotates a shaft 52 whose rotation is transmitted through a drive shaft 54 (and a gear mechanism including a bevel gear etc. (not shown)) to the high-pressure turbine shaft 40a to generate compressed air. The generated compressed air is supplied to the combustion chamber 26, as mentioned above.

The rotation of the shaft 52 is also transmitted to a PMA (permanent magnet alternator) 56 and the (high-pressure) fuel pump 34, whereby, as explained above, the fuel pump 34 is driven to supply metered fuel to the fuel nozzle 28 so as to be mixed with compressed air and atomized. The resulting air-fuel mixture is ignited to start combustion.

When the engine 10 reaches self-sustaining operating speed, the rotation of the high-pressure turbine shaft 40a is transmitted back to the shaft 52 through the drive shaft 54 (and the gear mechanism including the bevel gear etc. (not shown)) to drive the fuel pump 34 and also drive the PMA 56 and starter 50.

As a result, the PMA 56 generates electricity and the starter 50 also generates electricity to be supplied to the airframe. Therefore, particularly when the electrical load on the airframe side increases, power generated by the starter 50 increases and rotational load on the high-pressure turbine shaft increases, thereby affecting the high-pressure turbine rotational speed, as will be explained later.

An ECU (Electronic Control Unit) 60 is installed at an upward location of the main engine unit 10a. The ECU 60 is equipped with a microcomputer comprising a CPU, ROM, RAM, I/O etc. (none of which are shown) and is housed in a container for mounting at the upward position.

An N1 sensor (rotational speed sensor) 62 is installed near the low-pressure turbine shaft 42a of the engine 10 and outputs a signal indicating the rotational speed of the low-pressure turbine (rotational speed of the low-pressure turbine shaft 42a) N1 (so as to detect the speed N1), and an N2 sensor (rotational speed sensor) 64 is installed near the shaft 52 and outputs a signal indicating the rotational speed of the high-pressure turbine (rotational speed of the high-pressure turbine shaft 40*a*) (so as to detect the speed N2).

A T1 sensor (temperature sensor) 70 installed near an air intake 66 at the front of the main engine unit 10*a* outputs a signal indicating the engine inlet temperature (ambient or intake temperature) T1 (so as to detect the temperature the temperature T1). An EGT sensor (exhaust gas temperature sensor) 72 installed at a suitable location downstream of the low-pressure turbine 42 outputs a signal indicating the exhaust gas temperature (low-pressure turbine outlet temperature) EGT (so as to detect the temperature EGT).

A P0 sensor (pressure sensor) 74 installed inside the container that houses the ECU 60 outputs a signal indicating atmospheric pressure P0 (so as to detect the pressure P0), and a P1 sensor (pressure sensor) 76 installed near the air intake 66 outputs a signal indicating engine inlet pressure (air intake pressure) P1 (so as to detect the pressure P1). In addition, a P3 sensor 78 installed downstream of the high-pressure compressor 24 outputs a signal indicating compressor outlet pressure (outlet pressure of the high-pressure compressor 24) P3 (so as to detect the pressure P3).

The outputs of the foregoing sensors indicating the operating condition of the engine 10 are sent to the ECU 60.

On the airframe side are installed a flight altitude sensor 80 that produces an output indicating the flight altitude ALT of the aircraft (so as to detect the flight altitude ALT) and a flight speed sensor 82 that produces an output indicating the flight speed Mn (Mach Number) of the aircraft (so as to detect the speed Mn). The outputs of these sensors are also sent to the ECU 60 comprising a computer on the airframe side.

The high-pressure compressor 24 is equipped with a first BOV (Bleed Off Valve) 84 at a location of its front stage. During starting, low-speed operation and the like of the engine 10, some of the compressed air flowing through a compression passage of the high-pressure compressor 24 is bled off through the first BOV 84 and discharged into the duct 22.

The first BOV 84 is opened and closed by an electromagnetic solenoid valve operated by commands from the ECU 60. A BOV position sensor 86 installed near the first BOV 84 to produce and send to the ECU 60 a signal indicating the amount of air bled through the first BOV 84 based on the position (opening angle) of the first BOV 84 (so as to detect the bleed air amount).

In addition, the high-pressure compressor 24 is equipped with a second BOV (Bleed Off Valve) 90 at a location downstream of the first BOV 84, and some of the compressed air flowing through a compression passage of the high-pressure compressor 24 is bled off through the second BOV 90 and sent to the cabin etc. on the airframe side for airframe cabin pressurization, air conditioning, wing de-icing, air sealing and other purposes.

The second BOV 90 is opened and closed by an electromagnetic solenoid valve in response to manual operation of a switch by a pilot seated in the cockpit of the airframe. An airframe side computer sends the ECU 60 a signal indicating the switch operation, i.e., the position of the second BOV 90. The ECU 60 determines whether second BOV 90 is opened or not, more broadly it determines the amount of bleed air passing through the high-pressure compressor 24 and bled through the second BOV 90 based on the position of the second BOV 90.

Further, the ECU 60 is responsive to the position of a thrust lever operated by the pilot for controlling the operation of the torque motor 32*a* to open/close the fuel metering valve 32 and for energizing/de-energizing the electromagnetic solenoid 38*b* to open/close the fuel shutoff valve 38*a* and control supply of fuel to the fuel nozzle 28.

Figure 2:
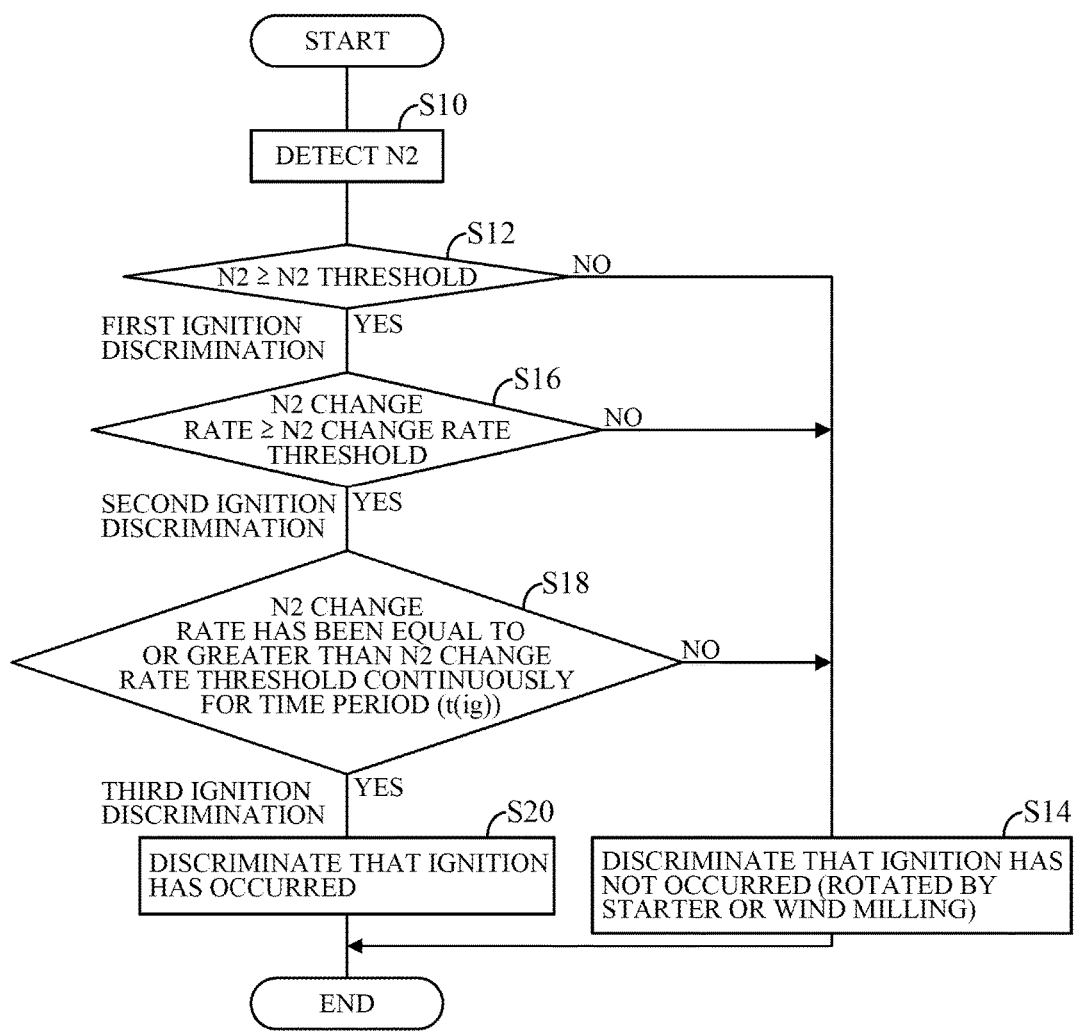
FIG. 2 is a flowchart for explaining operation of the apparatus.

FIG. 2 is a flowchart for explaining operation of the apparatus, more specifically the ignition discrimination operation (processing) of the ECU 60. The illustrated program is executed at predetermined time intervals.

Explaining this, in S10, the high-pressure turbine rotational speed (rotational speed of the high-pressure turbine 40) N2 is detected from the output of the N2 sensor 64 (S: processing Step).

Next, in S12, it is discriminated or determined whether the detected high-pressure turbine rotational speed N2 is equal to or greater than an N2 threshold (a predetermined rotational speed threshold suitably defined with consideration to the windmill effect). This is called a first ignition discrimination.

When the result in S12 is NO, the program goes to S14, in which it is discriminated or determined that ignition of the air-fuel mixture has not occurred in the combustion chamber 26 of the engine 10.

In other words, even though at starting of the engine 10, the high-pressure turbine 40 is rotated by the starter 50 or by windmilling, whereby compressed air is generated to be mixed with fuel sprayed from the fuel nozzle 28, so that the so-generated air-fuel mixture should be ignited by the exciter and sparkplug and burned, it is nevertheless discriminated that the ignition did not occur.

On the other hand, when the result in S12 is YES, the program goes to S16, in which the derivative of the detected high-pressure turbine rotational speed N2 is obtained to calculate the change rate (acceleration rate) of the high-pressure turbine rotational speed N2, and it is discriminated whether the calculated change rate of the high-pressure turbine rotational speed N2 is equal to or greater than an N2 change rate threshold (a suitably defined predetermined rotational speed change rate threshold). This is called a second ignition discrimination.

The program goes to S14 when the result in S16 is NO, and when it is YES, goes to S18, in which it is discriminated or determined whether the calculated change rate of the high-pressure turbine rotational speed N2 has been equal to or greater than the N2 change rate threshold continuously for a period equal to or greater than a suitably defined predetermined continuance time period (t(ig)). This is called a third ignition discrimination.

The program goes to S14 when the result in S18 is NO, and when it is YES, goes to S20, in which it is discriminated or determined that ignition of the air-fuel mixture has occurred in the combustion chamber 26 of the engine 10.

In other words, it is discriminated that ignition of the air-fuel mixture occurred in the combustion chamber 26 when it is found that the detected high-pressure turbine rotational speed N2 is equal to or greater than the N2 threshold, the change rate of the detected high-pressure turbine rotational speed N2 is equal to or greater than the N2 change rate threshold, and the change rate of the detected high-pressure turbine rotational speed N2 has been equal to or greater than the N2 change rate threshold continuously for a period (duration) equal to or longer than the predetermined continuance time period (t(ig)).

Figure 3:
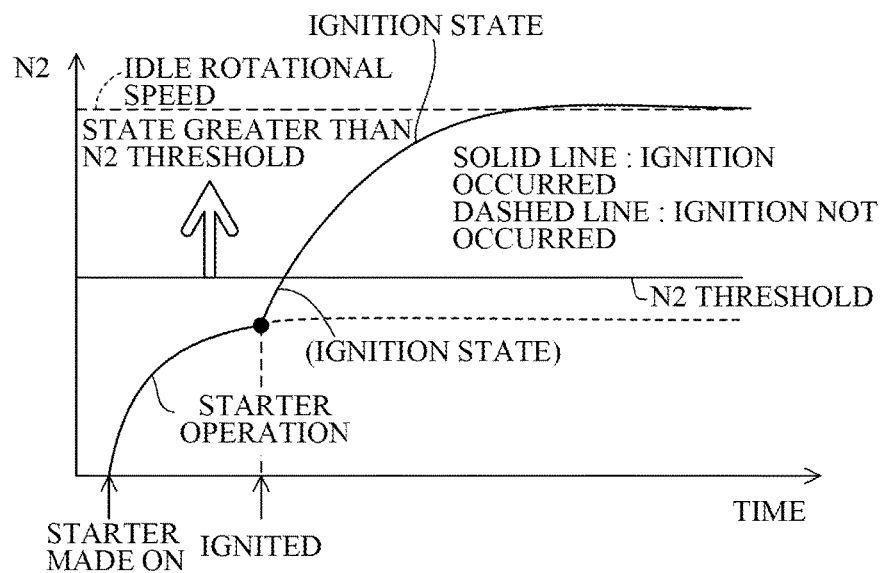
FIG. 3 is a time chart for explaining the processing of the flowchart of FIG. 2.
Figure 4:
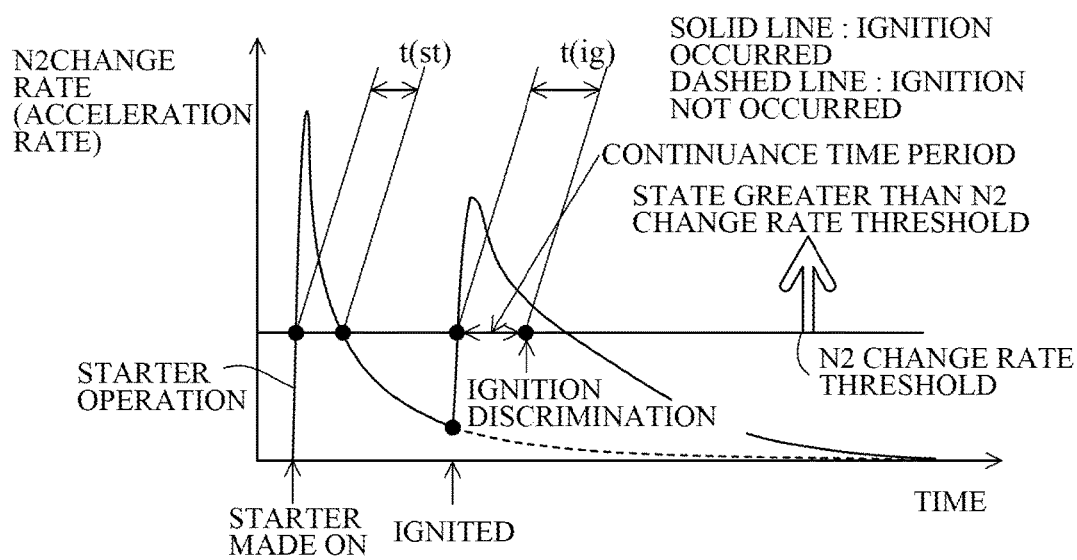
FIG. 4 is a time chart for similarly explaining the processing of the flowchart of FIG. 2.

FIGS. 3 and 4 are time charts for explaining the processing of the flowchart of FIG. 2.

The operations (processing) according to the flowchart of FIG. 2 will be explained with reference to these figures. As mentioned above, the engine 10 is started by operating the starter 50. As shown in FIG. 3, the high-pressure turbine rotational speed N2 is increased by the starter 50 and further rises to the idle rotational speed when combustion occurs in the combustion chamber 26. However, it does not rise beyond a certain level when ignition fails as shown by dashed lines. Therefore, it should be possible to discriminate whether or not ignition occurred by merely defining the N2 threshold in the vicinity of this certain level.

However, in the case where the engine 10 has been shut down and restarting is commenced before the high-pressure turbine rotational speed N2 falls below the threshold, no ignition actually occurs because the engine 10 is still shut down. Nevertheless, ignition may be judged to have occurred without the engine having restarted, so that there is a need to eliminate the cause for this.

Therefore, based on accumulated experience and knowledge, it was discovered that discrimination is possible by, as shown in FIG. 4, calculating the change rate of the high-pressure turbine rotational speed N2 and discriminating whether it is equal to or greater than a suitably defined N2 change rate threshold. However, the fact that the engine 10 is started by the starter 50 makes it necessary to eliminate the change of the high-pressure turbine rotational speed N2 this causes.

Again thanks to accumulated experience and knowledge, it was discovered that by discriminating whether the change rate of the high-pressure turbine rotational speed N2 continuously remains in a state equal to or greater than an N2 change rate threshold for a continuance time period or duration equal to or longer than a certain time period (predetermined time period) (t(ig)), the effect of the time period (t(st)) in the case of starter 50 operation can be eliminated to enable highly accurate discrimination of whether ignition of the air-fuel mixture occurred in the combustion chamber 26. As a result, whether or not the air-fuel mixture was ignited in the combustion chamber 26 can be discriminated with high accuracy even when the EGT sensor 72 fails, without using a dedicated sensor.

As stated above, the embodiment is configured to have an apparatus (and method) for discriminating ignition in a gas-turbine aeroengine (10) mounted on an aircraft and having at least a high-pressure turbine (40) rotated by injection of high-pressure gas produced upon ignition and combustion of an air-fuel mixture in a combustion chamber (26), and a low-pressure turbine (42) located downstream of the high-pressure turbine to be rotated by low-pressure gas exiting the high-pressure turbine, comprising: a high-pressure turbine rotational speed sensor (64; ECU 60, S10) adapted to detect a rotational speed (N2) of the high-pressure turbine (40); a turbine rotational speed threshold discriminator (ECU 60, S12) that discriminates whether the detected rotational speed of the high-pressure turbine (N2) is equal to or greater than a predetermined rotational speed threshold; a turbine rotational speed change rate calculator (ECU 60, S16) that calculates a change rate of the detected rotational speed of the high-pressure turbine (N2); a turbine rotational speed change rate threshold discriminator (ECU 60, S16) that discriminates whether the calculated change rate of the detected rotational speed of the high-pressure turbine (N2) is equal to or greater than a predetermined rotational speed change rate threshold; a continuance time period discriminator that discriminates (ECU 60, S18) whether the calculated change rate of the detected rotational speed of the high-pressure turbine has been equal to or greater than the predetermined rotational speed change rate threshold continuously for a predetermined time period (t(ig)), when it is discriminated that the calculated change rate of the detected rotational speed of the high-pressure turbine is equal to or greater than the predetermined rotational speed change rate threshold; and an ignition occurrence discriminator (ECU 60, S20) that discriminates that the ignition of the air-fuel mixture has occurred in the combustion chamber (26) when it is discriminated that the detected rotational speed of the high-pressure turbine (40) is equal to or greater than the predetermined rotational speed threshold, the calculated change rate of the detected rotational speed of the high-pressure turbine (40) is equal to or greater than the predetermined rotational speed change rate threshold, and the calculated change rate of the detected rotational speed of the high-pressure turbine (40) has been equal to or greater than the predetermined rotational speed change rate threshold continuously for the predetermined time period.

Thus, the apparatus for discriminating ignition in a gas-turbine aeroengine (10) is configured to discriminate that ignition occurred in a combustion chamber (26) upon discriminating that a calculated high-pressure turbine rotational speed change rate at a detected high-pressure turbine rotational speed equal to or greater than a predetermined rotational speed threshold is equal to or greater than a predetermined rotational speed change rate threshold and that the change rate has been equal to or greater than the predetermined rotational speed change rate threshold continuously for a predetermined time period or greater, whereby whether or not ignition of an air-fuel mixture occurred in a combustion chamber can be accurately discriminated or determined without using a dedicated sensor or detector even when an EGT sensor or detector fails. In addition, in a case where the EGT sensor or detector is normal and occurrence of ignition is discriminated based on the output of the output of the EGT sensor or detector, discrimination is possible concurrently with the detection based on the output of the EGT sensor or detector.

While the invention has thus been shown and described with reference to a specific embodiment, it should be noted that the invention is in no way limited to the details of the described arrangements; changes and modifications may be made without departing from the scope of the appended claims.

What is claimed is:

1. An apparatus for discriminating occurrence of ignition in a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure turbine to be rotated by low-pressure gas exiting the high-pressure turbine, comprising:

a high-pressure turbine rotational speed sensor adapted to detect a rotational speed of the high-pressure turbine;

a turbine rotational speed threshold discriminator that conducts a first discrimination to discriminate whether the detected rotational speed of the high-pressure turbine is equal to or greater than a predetermined rotational speed threshold to determine whether the ignition of the air-fuel mixture has not occurred in the combustion chamber;

a turbine rotational speed change rate calculator that conducts a change rate calculation to calculate a change rate of the detected rotational speed of the high-pressure turbine;

a turbine rotational speed change rate threshold discriminator that conducts a second discrimination to discriminate whether the calculated change rate of the detected rotational speed of the high-pressure turbine is equal to or greater than a predetermined rotational speed change rate threshold to determine whether the ignition of the air-fuel mixture has not occurred in the combustion chamber;

a continuance time period discriminator that conducts a third discrimination to discriminate whether the calculated change rate of the detected rotational speed of the high-pressure turbine has been equal to or greater than the predetermined rotational speed change rate threshold continuously for a predetermined time period to determine whether the ignition of the air-fuel mixture has not occurred in the combustion chamber; and an ignition occurrence discriminator that discriminates that the ignition of the air-fuel mixture has occurred in the combustion chamber when a result of the first discrimination is affirmative, a result of the second discrimination is affirmative, and a result of the third discrimination is affirmative, wherein the change rate calculation and the second discrimination are conducted when the result of the first discrimination is affirmative, and the third discrimination is conducted when the result of the second discrimination is affirmative, wherein the air-fuel mixture is delivered into the combustion chamber prior to the first discrimination.

2. The apparatus according to claim 1, wherein the turbine rotational speed change rate calculator calculates the change rate of the detected rotational speed of the high-pressure turbine by obtaining a derivative of the detected rotational speed of the high-pressure turbine.

3. A method for discriminating occurrence of ignition in a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure, turbine to be rotated by low-pressure gas exiting the high-pressure turbine, comprising the steps of:

detecting a rotational speed of the high-pressure turbine;

conducting a first discrimination to discriminate whether the detected rotational speed of the high-pressure turbine is equal to or greater than a predetermined rotational speed threshold to determine whether the ignition of the air-fuel mixture has not occurred in the combustion chamber;

conducting a change rate calculation to calculate a chance rate of the detected rotational speed of the high-pressure turbine;

conducting a second discrimination to discriminate whether the calculated change rate of the detected rotational speed of the high-pressure turbine is equal to or greater than a predetermined rotational speed change rate threshold to determine whether the ignition of the air-fuel mixture has not occurred in the combustion chamber;

conducting a third discrimination to discriminate whether the calculated change rate of the detected rotational speed of the high-pressure turbine has been equal to or greater than the predetermined rotational speed change rate threshold continuously for a predetermined time period to determine whether the ignition of the air-fuel mixture has not occurred in the combustion chamber; and discriminating that the ignition of the air-fuel mixture has occurred in the combustion chamber when a result of the first discrimination is affirmative, a result of the second discrimination is affirmative, and a result of the third discrimination is affirmative, wherein the change rate calculation and the second discrimination are conducted when the result of the first discrimination is affirmative, and the third discrimination is conducted when the result of the second discrimination is affirmative, wherein the air-fuel mixture is delivered into the combustion chamber prior to the first discrimination.

4. The method according to claim 3, wherein the step of turbine rotational speed change rate calculating calculates the change rate of the detected rotational speed of the high-pressure turbine by obtaining a derivative of the detected rotational speed of the high-pressure turbine.

5. The apparatus according to claim 1, wherein the turbine rotational speed threshold discriminator conducts the first discrimination at predetermined time intervals.

6. The apparatus according to claim 1, wherein the predetermined rotational speed threshold is set with consideration to a windmill effect.

7. The apparatus according to claim 1, wherein the predetermined rotational speed threshold is set greater than a rotational speed caused by a starter or by windmilling.

8. The method according to claim 3, wherein the first discrimination is conducted at predetermined time intervals.

9. The method according to claim 3, wherein the predetermined rotational speed threshold is set with consideration to a windmill effect.

10. The method according to claim 3, wherein the predetermined rotational speed threshold is set greater than a rotational speed caused by a starter or by windmilling.

* * * * *